Oct. 19, 1943.  D. A. KELLY  2,332,088
ILLUMINATED LIQUID LEVEL GAUGE
Filed May 19, 1941  3 Sheets-Sheet 1

INVENTOR
D. A. KELLY

BY

ATTORNEYS

Oct. 19, 1943.   D. A. KELLY   2,332,088
ILLUMINATED LIQUID LEVEL GAUGE
Filed May 19, 1941    3 Sheets-Sheet 2

INVENTOR
D. A. KELLY
BY
ATTORNEYS

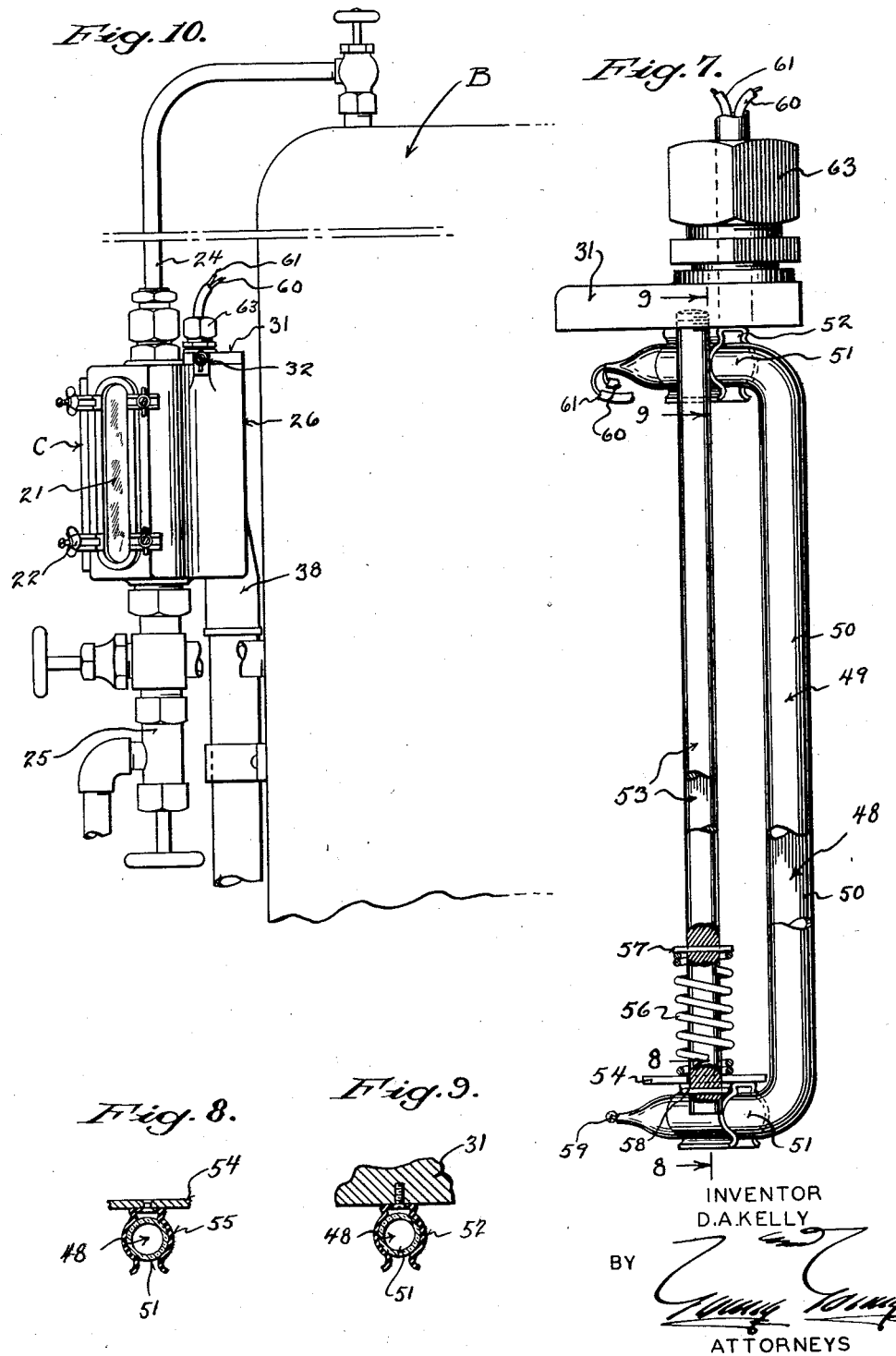

Patented Oct. 19, 1943

2,332,088

UNITED STATES PATENT OFFICE 2,332,088

ILLUMINATED LIQUID LEVEL GAUGE

Daniel Allcott Kelly, Milwaukee, Wis., assignor to The Prime Manufacturing Company, Milwaukee, Wis.

Application May 19, 1941, Serial No. 394,105

3 Claims. (Cl. 73—293)

This invention appertains to water gauges for locomotive boilers, and more particularly to novel means for facilitating the reading of the height of the water in the gauge glass from any angle in the cab or tender.

One of the primary objects of my invention is to provide a novel illuminator for water gauges of locomotives, whereby the height of the water in the glass can be readily seen, both during the day and nighttime.

Another salient object of my invention is to provide a gas discharge tube located in a predetermined manner in rear of the glass of the locomotive water gauge, whereby the water in the glass, when viewed from the front or side, will appear to assume the color of the illuminating tube and thereby be clearly visible to the eye.

Another important object of my invention is to combine with a conventional water gauge and guard casing therefor, a novel housing for detachably receiving a neon lamp or similar gas discharge tube for effectively illuminating the glass of the water gauge.

A further object of my invention is to provide a removable partition plate between the guard casing and the light housing and arranged in rear of the water glass, with vertically disposed, angularly related sight slots therein for illuminating the water glass, so that the height of the water in the glass can be readily seen from different angles in the locomotive cab and tender.

A further important object of my invention is to provide a pair of vertically disposed, spaced gas discharge tubes in the light housing arranged in predetermined relation to the sight slots in the partition plate and to the gauge glass, whereby to permit the effective illumination of the water in the gauge glass.

A still further important object of my invention is to provide novel means for detachably and resiliently supporting the gas discharge tubes from the removable cover of the light housing, whereby not only will the tubes be maintained in their proper position in the housing, but whereby the tubes can be quickly and easily removed for replacement and the like.

With these and other objects in view, the invention consists in the novel construction, arrangement, and formation of parts, as will be hereinafter more specifically described, claimed, and illustrated in the accompanying drawings, in which drawings:

Figure 7 is an enlarged, fragmentary, detail view illustrating the removable cover for the light housing and showing the novel means carried thereby for supporting the neon lamps or other gas discharge tubes.

Figure 8 is a fragmentary, detail, sectional view taken on the line 8—8 of Figure 7, looking in the direction of the arrows, illustrating one of the bottom clips carried by the spring-urged cross plate for receiving the lower end of one of the tubes.

Figure 9 is a fragmentary, detail, sectional view taken on the line 9—9 of Figure 7, looking in the direction of the arrows, and illustrating one of the upper clips for receiving the top end of one of the gas discharge tubes.

Figure 10 is a fragmentary, side, elevational view showing my novel appliance applied to the boiler of a steam locomotive.

Referring to the drawings in detail, wherein similar reference characters designate corresponding parts throughout the several views, the letter B indicates the boiler of a steam locomotive, and G the water gauge therefor.

Figure 1:
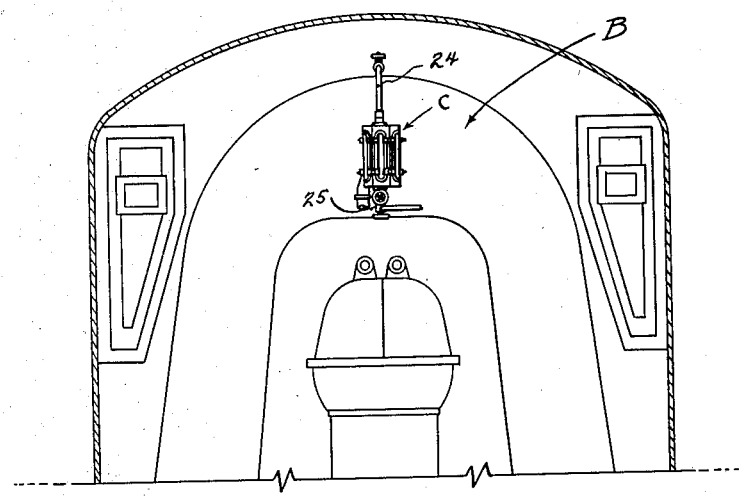
Figure 1 is a fragmentary, transverse, sectional view through a cab of a locomotive, looking toward the boiler and showing my novel device incorporated with the boiler.
Figure 2:
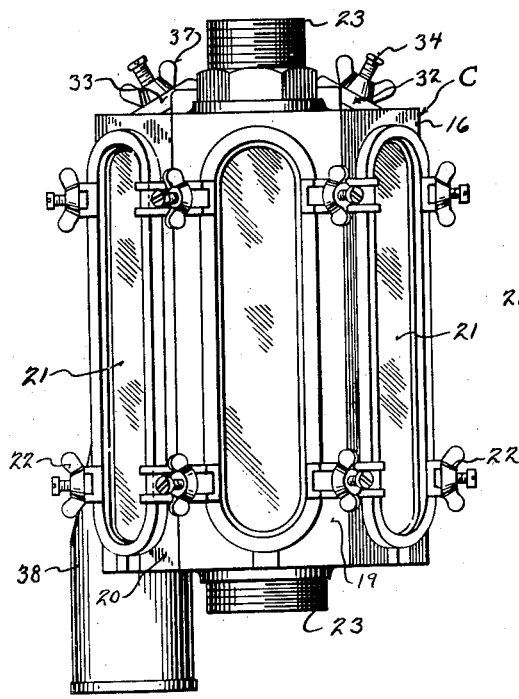
Figure 2 is an enlarged, front, elevational view of my appliance.
Figure 3:
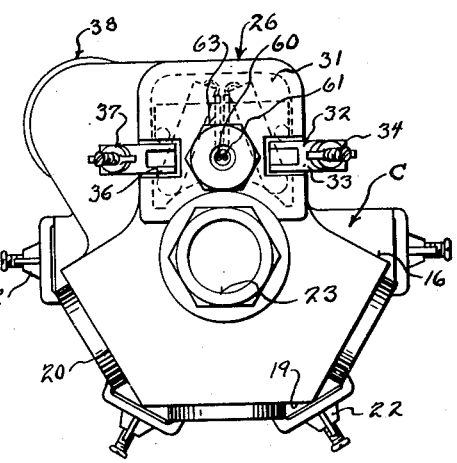
Figure 3 is a top plan view of my appliance.

The water gauge G includes the vertically disposed water glass 15, and the same is housed in any preferred manner within a guard casing C. The casing C includes a hollow body 16 having integral top and bottom walls 17 and 18, and front and side walls 19 and 20. These front and side walls receive glass or other transparent panels 21, and the glasses are positioned in relatively angled vertical planes, so that the gauge glass 15 will be visible from the front and sides of the guard. The glass panels can be detachably held in place in any preferred manner, such as by the use of suitable clamps 22.

The top and bottom walls 17 and 18 of the guard casing carry sleeves 23 for the ends of the gauge or sight glass 15. The sight glass 15 is held in any suitable manner in the sleeves, as is well understood in the art, for communication with the pipes 24 and 25 leading to the boiler.

In accordance with my invention, I form on the rear of the guard casing C in back of the gauge or sight glass 15, an integral housing 26, which forms means for receiving my appliance for effectively illuminating the gauge or sight glass. This housing 26 extends the full height of the guard casing and is formed integral with the guard casing. As illustrated, the light housing 26 includes the side walls 27 and 28, the bottom wall 29, and the rear wall 30. The upper end of the housing is closed by a removable cover plate 31. This cover plate is firmly and tightly held in position by suitable clamps 32. These clamps 32 include clamp plates 33 loosely fitted on threaded studs 34 anchored in angularly extending bosses 35 formed on the side walls 27 and 28 of the light housing. The forward ends of the clamp plates are adapted to be received within keeper grooves 36 formed on the opposite sides of the upper surface of the cover plate 31. Winged or similar nuts 37 are threaded on the studs for firmly holding the clamp plates in position.

A depending tubular extension 38 on the casing C provides a drain for connection with a hose, as is also well understood in this art. The extension is arranged at one side of the light housing 26, as can be readily seen by referring to Figures 4 and 5 of the drawings.

The forward ends of the side walls 27 and 28 of the light housing have formed thereon inwardly directed, vertically disposed ribs 39, which extend into the casing C on each side of the gauge or sight glass 15, and these ribs 39 form a support for detachably receiving the partition plate 40, which will now be described in detail.

The plate 40 is preferably formed from sheet metal and extends from the top to the bottom of the casing C and the light housing 26. The same is of a substantially U-shape in cross section, and, hence, includes a flat rear wall 41, which is disposed wholly within the light housing and forwardly extending side walls 42. The front edges of the side walls 42 have formed thereon inturned flanges 43, and these flanges carry rearwardly directed attaching flanges 44. The attaching flanges 44 are fitted snug against the angularly extending ribs 39, and are detachably fastened to said ribs by means of screws or the like 45. The rear wall 41 of the partition plate has formed therein a centrally disposed, vertically extending slot 46, and this slot is arranged directly in rear of the water or sight glass 15. The side walls 42 of the partition plate have formed therein, adjacent the angular flanges 43, vertically extending slots 47. The slots 46 and 47 extend substantially the full length of the plate and, hence, substantially the full length of the casing C.

Figure 4:
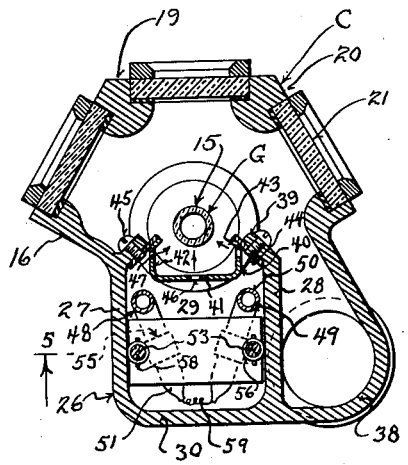
Figure 4 is a horizontal sectional view through the appliance, taken on the line 4—4 of Figure 5, looking in the direction of the arrows, illustrating my novel partition plate between the guard casing and the light housing.
Figure 6:
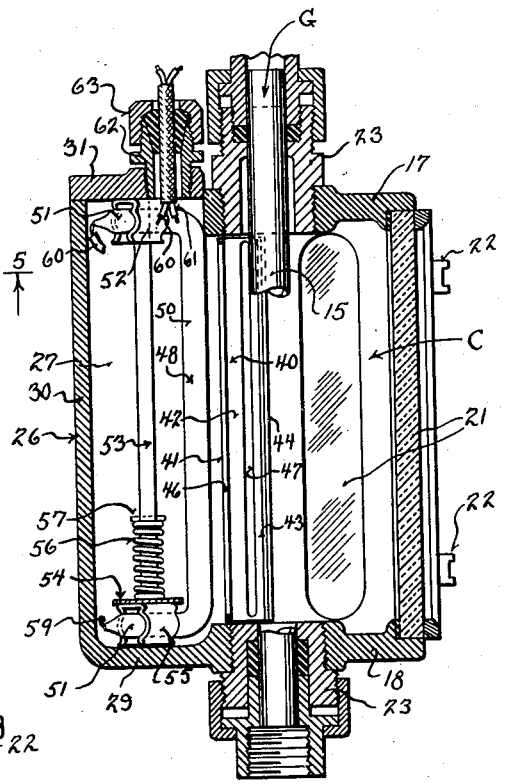
Figure 6 is a vertical sectional view taken at right angles to Figure 5, and on the line 6—6 of Figure 5, looking in the direction of the arrows, the view illustrating the mounting of one of the gas discharge tubes and the arrangement of the partition plate in the appliance.
Figure 5:
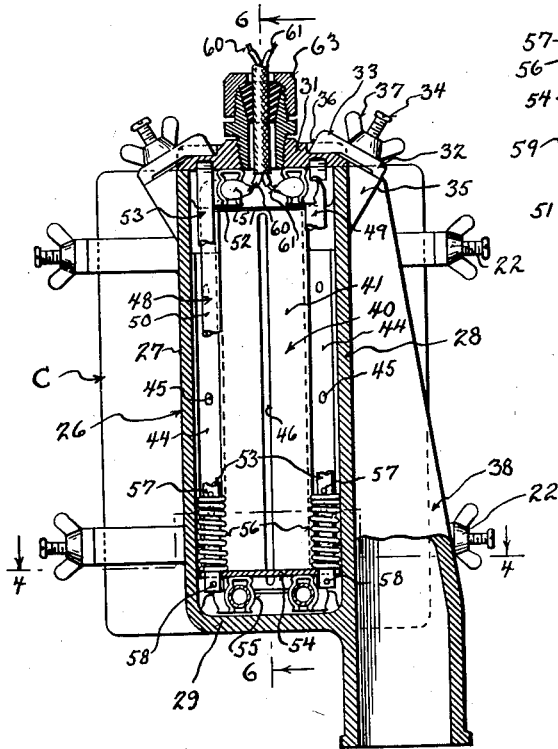
Figure 5 is a vertical sectional view through my appliance, taken on the line 5—5 of Figure 4, looking in the direction of the arrows, illustrating the novel means employed for supporting the gas discharge tubes.

I have provided novel means for illuminating the water gauge or sight glass 15, and this means includes the use of two neon lamps 48 and 49 or similar gas discharge tubes. Each neon lamp includes a vertical stretch 50 and right-angularly extending legs 51. The vertical stretches 50 of the neon tubes are disposed in rear of the partition plate 40, and on opposite sides of the central slot 46. By referring to Figure 4, it can be seen that the bodies or vertical stretches of the neon tubes or lamps are arranged substantially at the corners of the partition plate 40, so that rays of light emanating from the neon lamps will be visible through the slots 46 and 47. It is to be also noted (as best shown in Figure 4) that the slots 46 and 47 are so disposed that the same face the angularly related sight panels 21 of the casing.

These neon or other gas discharge tubes 48 and 49 are supported in a novel manner from the removable cover plate 31 of the light housing 26. Thus, the cover plate 31, at spaced points, is provided with depending resilient clips 52 for detachably receiving the upper legs 51 of the tubes. The cover plate 31 also carries a pair of spaced depending guide rods 53, and the lower ends of these guide rods have slidably mounted thereon a bridge or cross plate 54.

The lower face of the cross plate 54 has secured thereto a pair of spaced resilient clips 55, which detachably receive the lower legs 51 of the neon or other gas discharge tubes. The clips 52 and the clips 55 are of the same construction, and both sets of the clips face downwardly, and all of the clips are of a substantially U-shape in cross section and include resilient jaws. The bridge or cross plate 54 is normally urged downwardly toward the lower ends of the guide rods 53 by means of expansion springs 56, which are coiled about said guide rods. The upper ends of the coil springs 56 bear against stop pins 57 secured to the rods, and the lower ends of the springs bear against the upper face of the cross or bridge plate 54. Extreme downward movement of the cross plate on the rods is limited by stop pins 58 detachably connected with said rods.

The neon or other gas discharge tubes 48 are inserted in place in the following manner. The cover plate 31 is first removed from the light casing 26, after which the upper and lower legs 51 of the tubes are placed in engagement with the upper and lower sets of clips 52 and 55, and upon upward movement of the tubes, the legs of the tubes can be forced between the resilient jaws of the clips. The lower terminals of the tubes can be connected together by a wire 59, and the upper leads 60 and 61 of the tubes can be led through an opening 62 formed in the cover plate 31. A suitable stuffing box or the like 63 is employed for closing the opening around the leads, and these leads are then led to a suitable source of electrical energy.

Due to the arrangement of the clips 52 and 55 and the springs 56, the neon or other gas discharge tubes 48 are resiliently held, and the bridge plate 54 takes care of any difference or variance in the length of the tubes.

From the foregoing description it can be seen that the tubes can be readily fitted in the light housing or removed therefrom by the mere disconnection of the cover plate 31 from the light housing 26.

When the gas discharge tubes are in operation, the position of the slots 46 and 47 in the partition plate 40 relative to the tubes is so disposed as to permit the rays of light emanating from the tubes to pass into the interior of the guard casing C for illuminating the gauge or sight glass 15.

In actual practice, if the neon lamps are of a red color, the water in the gauge or sight glass, when viewed from the front or side, will appear to assume the color of the neon lamps, and, thus, the water will appear to be of a red color, and, hence, the height of the water can be easily determined.

Changes in details may be made which do not depart from the spirit and scope of my claims, and what I claim as new is:

1. In a water gauge for boilers, a guard casing, a water gauge sight glass extending vertically through the casing, said casing having angularly related windows disposed around the sight glass to permit the viewing of the glass, a housing carried by the rear of the casing communicating therewith and extending the full length thereof, a partition plate disposed between the housing and the casing and arranged in rear of the water gauge sight glass, said partition plate being of a substantially U-shape in cross section and including a rear wall and side walls, said rear wall having a light slot therein arranged directly in rear of the sight glass, and said side walls having slots therein disposed on opposite sides of the sight glass, all of the slots extending substantailly the full length of the partition plate with the slots facing the angularly related windows in the casing, and a pair of vertically disposed gas discharge tubes positioned in said housing in rear of the partition plate and extending the full length of said partition plate, said tubes being positioned on opposite sides of the slot in the rear wall of the partition plate.

2. In a water gauge for boilers, a guard casing, a water gauge sight glass extending vertically through the casing, said casing having angularly related windows disposed around the glass to permit the viewing of the glass, a housing formed on the rear of the casing and extending substantially the full length of said casing and including spaced side walls, inwardly extending ribs formed on the front of said side walls extending into the casing on opposite sides of the sight glass, a partition plate disposed between the casing and the housing in rear of the sight glass of a substantially U-shape in cross section and including a rear wall, side walls, and angularly related flanges butting the ribs, means connecting the flanges to the ribs, said partition plate having vertically extending slots in the walls thereof facing the angularly related windows of the casing, and gas discharge tubes arranged in the housing in rear of the partition plate disposed between the slots in the walls thereof.

3. In a water gauge for boilers of the type having a light housing, a removable cover for the housing, gas discharge tubes supported solely from said cover including vertically extending stretches, means for supporting the tubes from the cover including clips carried by the inner surface of the cover for detachably receiving the upper ends of the tubes, spaced depending guide rods secured to the cover, a slide plate mounted on the guide rods, depending resilient clips secured to the slide plate for detachably receiving the lower ends of the tubes, and resilient means normally urging the slide plate toward the lower ends of the rods and away from the cover and the clips carried thereby.

DANIEL ALLCOTT KELLY.